United States Patent [19]
Aindow et al.

[11] Patent Number: 5,375,613
[45] Date of Patent: Dec. 27, 1994

[54] CIGARETTE MANUFACTURE

[75] Inventors: Alan M. Aindow; Michael J. Cahill; John Dawson; Philip Haddow, all of Coventry; Norman L. Sharp, High Wycombe, all of England

[73] Assignee: Molins plc, Milton Keynes, England

[21] Appl. No.: 894,631

[22] Filed: Jun. 5, 1992

[30] Foreign Application Priority Data

Jun. 5, 1991 [GB] United Kingdom ............... 9112105

[51] Int. Cl.⁵ ............................................. A24C 5/60
[52] U.S. Cl. ................................. 131/281; 219/121.7; 219/121.84
[58] Field of Search ............... 131/281; 219/121.6, 219/121.7, 121.71, 121.84, 121.83; 606/10, 16

[56] References Cited

U.S. PATENT DOCUMENTS

| | | | |
|---|---|---|---|
| Re. 31,478 | 12/1983 | McArthur et al. | 219/121.7 |
| 3,524,046 | 8/1970 | Brouwer | 219/121.7 X |
| 4,027,137 | 5/1977 | Liedtke | 219/121.6 X |
| 4,319,120 | 3/1982 | La Rocca | 219/121.6 X |
| 4,349,719 | 9/1982 | Cashwell et al. | 219/121.7 |
| 4,404,454 | 9/1983 | Taylor et al. | 219/121.7 |
| 4,410,785 | 10/1983 | Lilly, Jr. et al. | 219/121.7 |
| 4,500,770 | 2/1985 | Vock et al. | 219/121.7 |
| 5,052,414 | 10/1991 | Aindow et al. | 131/281 |
| 5,154,707 | 10/1992 | Rink et al. | 606/16 X |

FOREIGN PATENT DOCUMENTS

0021165  1/1981  European Pat. Off. ............ 131/281

Primary Examiner—Jennifer Bahr
Attorney, Agent, or Firm—Antonelli, Terry, Stout & Kraus

[57] ABSTRACT

In cigarette conveying apparatus cigarettes are conveyed along a path so that they are intercepted in sequence by beams directed at different portions of the path to produce a complete circumferential row of perforations on each cigarette after it has traversed the path. An incident laser beam (14) is time-shared to produce pulses for making perforations by mutually inclined rotatable discs (20, 28). A temperature sensor (150) is provided to detect build-up of contaminants on a lens or mirror (146) for a laser beam (32B). A stream of air containing small quantities of water is supplied by tubes (380,388) terminating in the region in which the cigarettes are perforated so as to assist removal of contaminants resulting from laser perforation.

24 Claims, 9 Drawing Sheets

CIGARETTE MANUFACTURE

This invention relates to cigarette manufacture, particularly of ventilated cigarettes which have perforations generally in the region of the filter or mouth end of the cigarette.

It is known to produce perforations in the wrappers of complete or nearly complete cigarettes by means of a focused laser beam. Known systems for achieving this typically involve rotating the cigarette about its own axis, which can be damaging to the cigarette, and/or mechanically or optically complicated, and/or require relatively high levels of laser power. British patent specifications Nos. 2230688A and 2238704A disclose improved methods of producing perforations in cigarettes. The disclosures of said specifications are hereby incorporated herein in their entireties.

According to one aspect of the present invention an apparatus for perforating cigarettes, particularly in a cigarette making machine, comprises a conveyor for supporting spaced cigarettes and conveying them along a path without rotating them about their own axes, means for generating an incident beam of laser radiation, means synchronized with said conveyor for producing a plurality of secondary beams from said incident beam, means for directing said secondary beams in sequence along a plurality of beam paths which intercept a cigarette at different positions along a portion of said path and which produce perforations in different portions of a cigarette, such that when a cigarette has traversed said portion of said path it has received perforations from each of said beams, said perforations lying in a row extending substantially around the circumference of the cigarette. Preferably the means for producing secondary beams includes means for producing pulsed beams from said incident beam, which may be continuous. In a preferred arrangement spacing of the perforations on each of said portions of a cigarette is achieved solely by movement of the cigarette relative to the beam. In order to achieve adequate spacing between the perforations while also maintaining reasonable focus of the beam we have found that an angle of incidence of the beam which is in the region of 30°–45° to a line passing through the axis of the cigarette and perpendicular to its direction of conveyance is appropriate.

Preferably the period during which each secondary beam produces perforations in each of said portions of a cigarette is related to the speed of conveyance of the cigarettes on said path such that the last perforation made in one cigarette and the first perforation made in the following cigarette are consecutive pulses of the respective secondary beam. In this way the laser can be used continuously so that it is producing perforations for all of its operating time, and hence in its most efficient condition. The consequence is that a laser of lower power than would otherwise be required may be used. Preferably each secondary beam makes a series comprising a predetermined number of perforations in a defined region of each cigarette. For example, there may be four secondary beams each of which produces five perforations in a different quadrant of each cigarette. Preferably all the perforations made in a defined region of a cigarette are made by consecutive pulses of the respective secondary beam. Preferably also, each cigarette receives all its perforations in a first defined region, followed by all its perforations in a second defined region, and so on until it has received perforations in all of its defined regions.

According to another aspect of the invention apparatus for perforating cigarettes comprises a conveyor for supporting spaced cigarettes and for conveying them along a path, means for generating an incident beam of laser radiation, means synchronized with said conveyor for producing a plurality of secondary beams from said incident beam, and means for directing said secondary beams in sequence along a plurality of beam paths which intercept a cigarette on said path, wherein the means for producing a plurality of secondary beams comprises first and second rotatable elements respectively rotatable about mutually inclined axes, each of said elements comprising alternating reflective and transmissive elements. Preferably said means for producing a plurality of secondary beams comprises means for producing pulsed beams from a continuous incident beam. Preferably said directing means is arranged such that each pulse of each of said secondary beams intercepts a cigarette on said path to produce a perforation.

According to a further aspect of the invention apparatus for perforating cigarettes, particularly in a cigarette making machine, comprises means for producing a beam of laser radiation, and means for directing said beam towards a cigarette path so as to make perforations in cigarettes on said path with attendant production and release of potentially contaminating products, including means adjacent said path for reducing the tendency for said products to be directed along the path of said beam. In one preferred arrangement said means comprises shielding means (which may comprise physical shielding means) and is particularly intended to reduce contamination of any transmissive or reflective element (e.g. lens or mirror) in the beam path relatively close to the cigarette path. Preferably the shielding or other means adjacent said path includes or is associated with air flow means for directing said potentially contaminating products. In a particularly preferred arrangement shielding means is provided including transverse channel means having aperture means aligned with the beam path and through which the beam passes and means for directing a transverse air stream through the channel for deflecting or diverting potentially contaminating products away from the beam path.

Said shielding means may include a surface having an aperture through which the beam is arranged to pass, and means for directing a mixture of air and water along said surface, preferably in Coanda effect, so as to deflect potentially contaminating products away from said aperture. In practice it has been found that the entrainment of water in the air flow provides a marked improvement in preventing build up of contamination on the surface in the vicinity of said aperture and prolongs the intervals between more extensive cleaning operations necessary to prevent obstruction or partial obstruction of the beam path by combustion or other products resulting from laser perforation.

The invention also extends to the entrainment of water in an air stream for use in reducing contamination in cigarette making and processing equipment generally.

According to a still further aspect of the invention apparatus for perforating cigarettes, particularly in a cigarette making machine, comprises means for producing a beam of laser radiation, and means for directing said beam towards a cigarette path, said directing means including at least one reflective or transmissive element potentially subject to contamination from tobacco dust or other contaminants (e.g. combustion or other products of perforation) tending to reduce the transmission or reflection properties of said element, wherein means are provided for detecting change in temperature due to absorption of radiation by said contaminants, whereby an indication of excessive contamination may be provided.

The invention will be further described, by way of example only, with reference to the accompanying diagrammatic drawings, in which.

Figure 1:
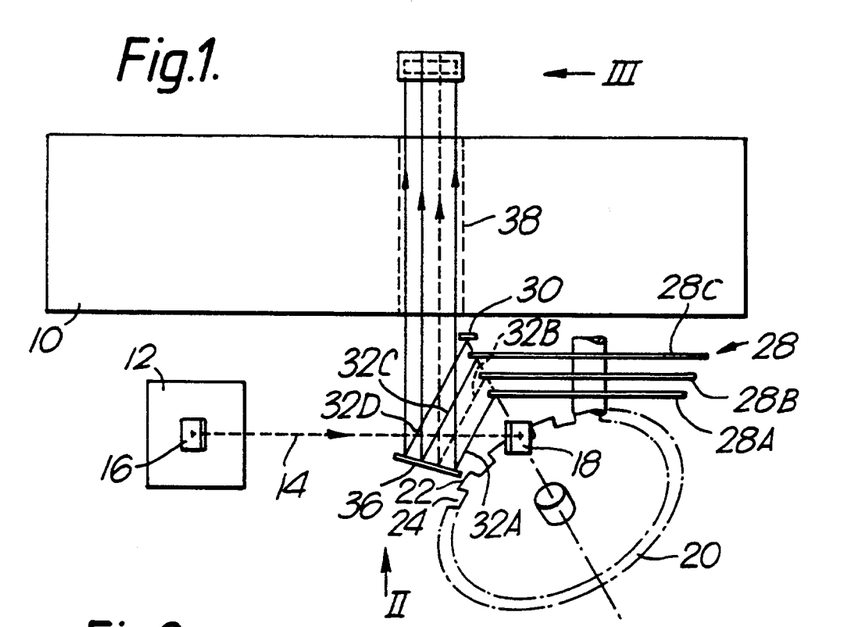
FIG. 1 is a plan view of cigarette perforating apparatus.
Figure 2:
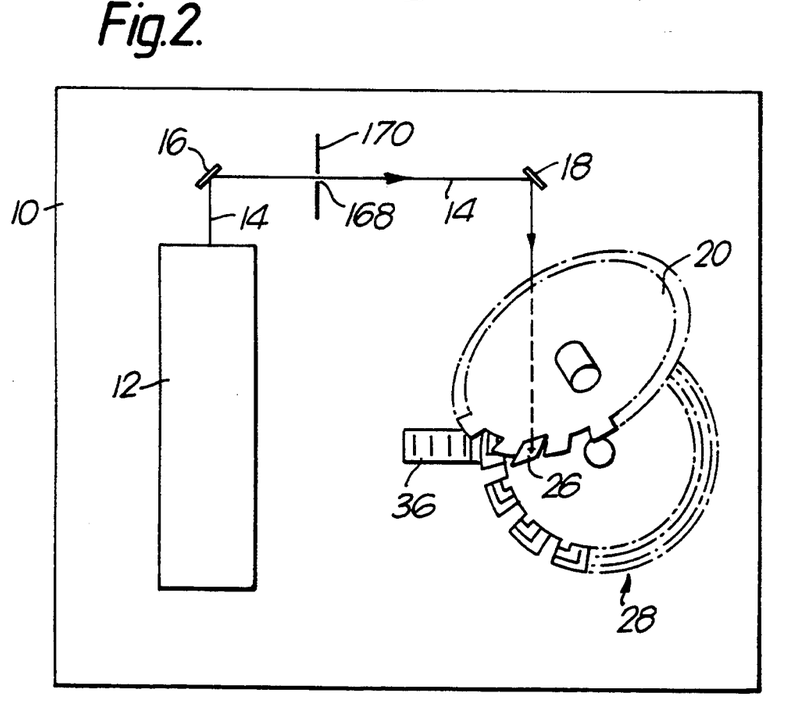
FIG. 2 is a side view in the direction of arrow II in FIG. 1.

The cigarette perforating apparatus of FIGS. 1 and 2 is incorporated in a filter cigarette assembling machine 10. A laser source 12 emits a continuous laser beam 14 which is directed by stationary mirrors 16, 18 towards a first reflective disc 20 which is rotated at a speed related to the speed of the machine 10. The disc 20 carries a series of reflective elements 22 separated by gaps 24 having the same angular width as the elements 22. As the disc 20 rotates the beam 14 is alternately reflected by an element 22 or passes through a gap 24. After passing through the gap 24 the beam impinges on a stationary mirror 26 which is arranged with its reflective surface parallel to that of an element 22 occupying the position at which it reflects the beam 14. The effect of this is that two parallel pulsed beams (lying one above the other in a vertical plane) are directed towards a multiple disc unit 28. The mirror 26 may be a rotating diamond-turned disc lying in the plane of the mirror: this has the advantage that the laser beams do not always impinge on the same part of the mirror.

The unit 28 comprises three discs 28A, 28B and 28C, each having reflective elements separated by gaps, the reflective elements and gaps overlapping as shown in FIG. 2. The relative timing of the disc 20 and unit 28 is such that if a first series or train consisting of a predetermined number of pulses from the disc 20 impinges on a reflective element of the disc 28A then the next train of said predetermined number of pulses will impinge on an element of the disc 28B, the next train of pulses on an element of the disc 28C, and the next train of pulses will pass through the gaps between the elements on the unit 28. The next (fifth) train of said predetermined number of pulses will impinge on the next reflective element of the disc 28A, and so on. The pulses which pass through the gaps in the unit 28 are reflected by a further stationary mirror 30. Four pulsed beams 32A, 32B, 32C, and 32D are therefore generated from the single pulsed beam produced by the reflective elements 22 of the disc 20. Similarly four pulsed beams 34A, 34B, 34C, and 34D (shown in FIG. 3), lying below the beams 32A-D, are generated from the pulsed beam reflected by the mirror 26. Each of the beams 32A-D, 34A-D is reflected by a further stationary mirror 36 so that the beams are directed through an aperture 38 in the frame of the machine 10.

Figure 3:
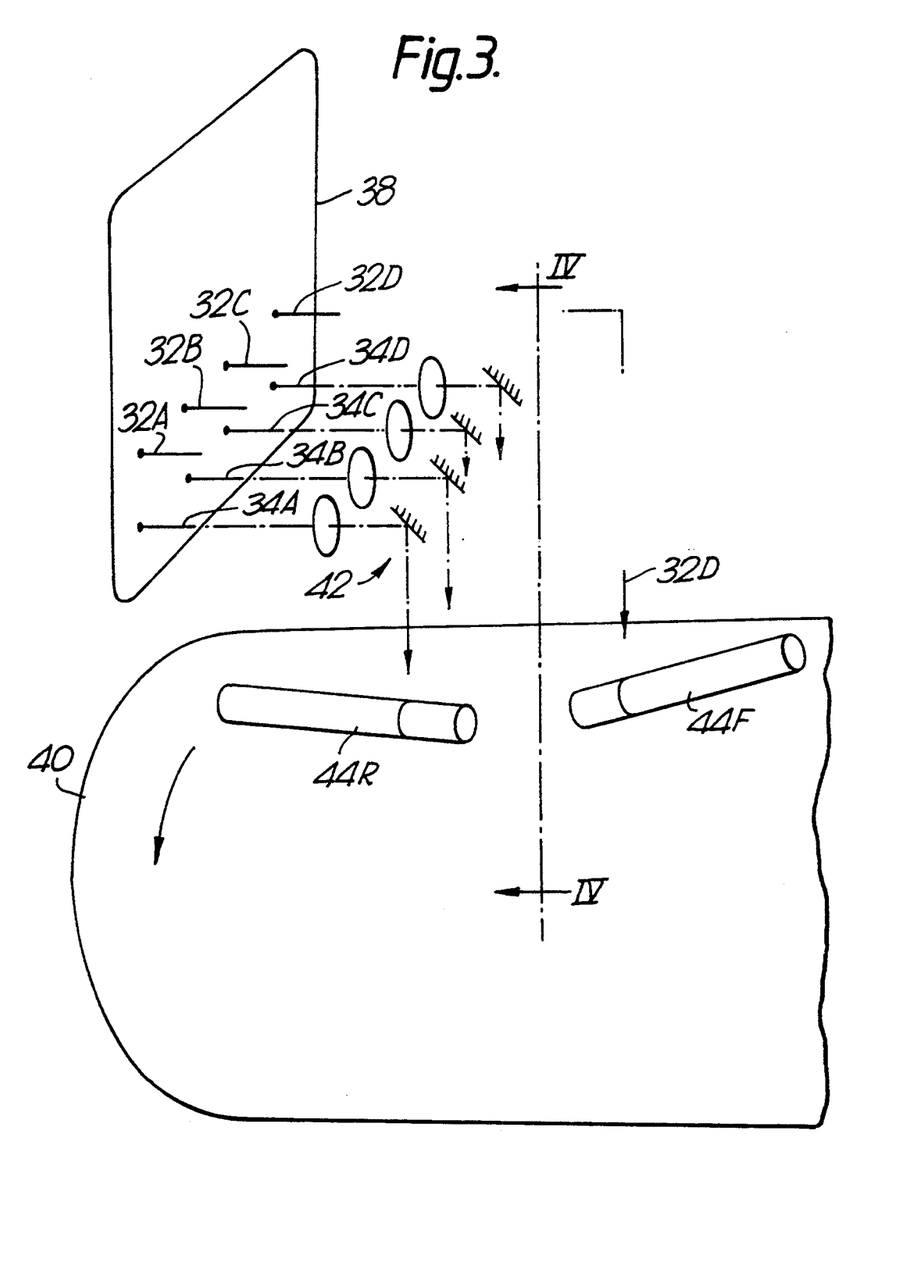
FIG. 3 is a perspective view in the direction of arrow III in FIG. 1.
Figure 4:
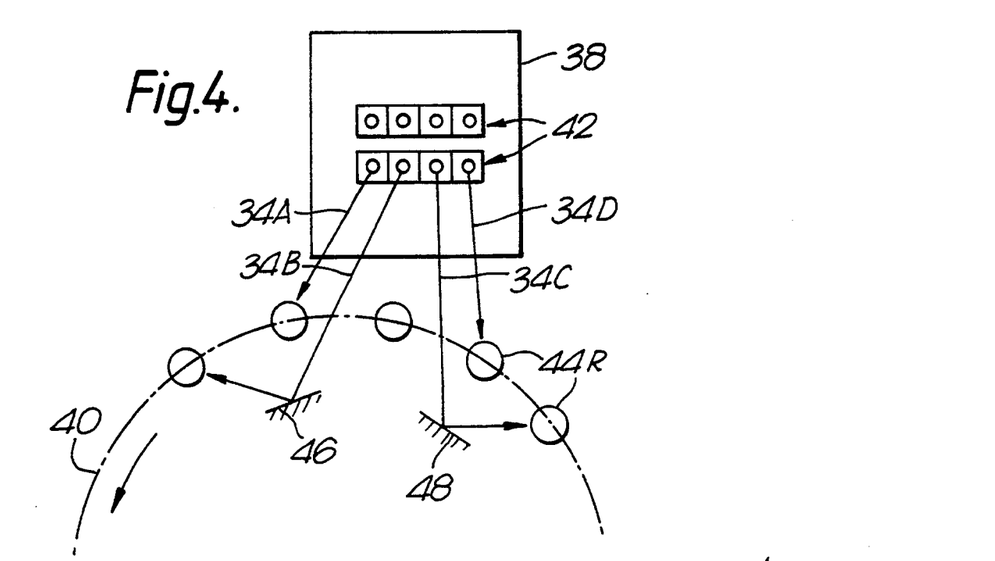
FIG. 4 is a schematic view on the line IV—IV in FIG. 3.
Figure 5A:
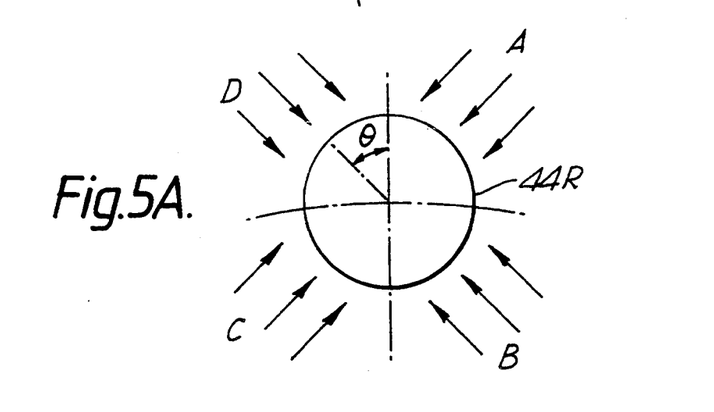
FIGS. 5A and 5B illustrate how perforations extending around the circumference of a cigarette are made.

As shown in FIG. 3, the beams 32A-D and 34A-D emerge from the aperture 38 adjacent a fluted drum conveyor 40 carrying front and rear rows of filter cigarettes 44F, 44R. Each beam is individually focused and reflected, by units indicated diagrammatically at 42, so as to be directed at a particular cigarette position on the drum 40. As shown in FIG. 4, each of the beams 34A-D is directed towards a cigarette at a different position on the drum 40. As shown also in FIG. 5A, each beam makes perforations within one of four imaginary quadrants around the circumference of a cigarette 44R. Note that additional stationary mirrors 46, 48 are provided to direct the beams 34B and 34C respectively to the inner quadrants of the cigarettes 44R. Typically each beam pulses five times while a cigarette is passing (i.e. the predetermined number of pulses in each train of pulses is typically five), so that each cigarette receives five circumferentially spaced perforations in each quadrant, making a total of 20 perforations in a circumferential row around each cigarette 44R after it has passed all four beams 34A-D. Note that in FIG. 5A the arrows indicate the approximate extent of the positions of the perforations made in each quadrant: it should be understood, however, that each of the beams 34A-D is single and stationary, the circumferential spacing around each quadrant being achieved solely by movement of the cigarette 44R with the drum 40. Although the explanation has been made with reference to the perforation of cigarettes 44R on the rear track of the drum 40 by the beams 34A-D, it will be understood that the perforation of cigarette 44F on the front track by the beams 32A-D is similar. Note that although perforations normally extend over about 70° in each of four quadrants, uniform spacing of perforations around a cigarette may be achieved if required by blocking off certain gaps and/or reflectors in the unit 28.

Figure 5B:
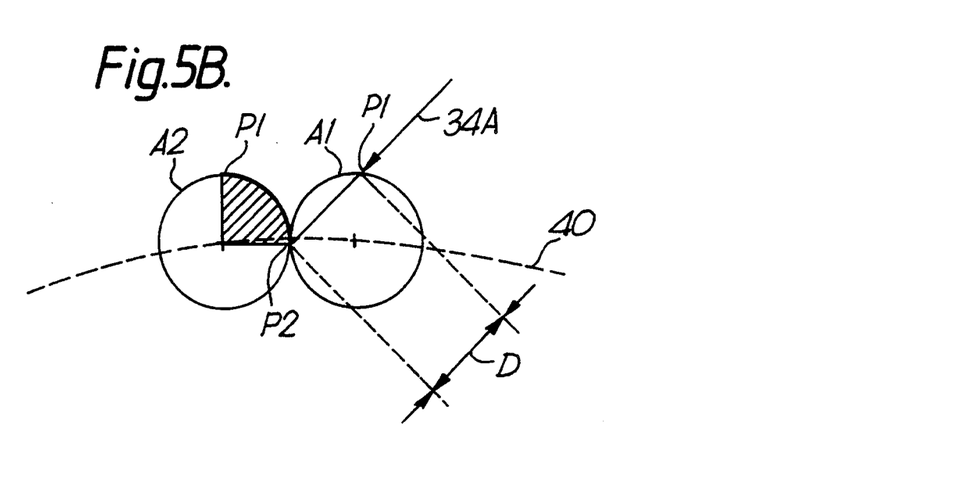

FIG. 5B shows a cigarette (44R) on conveyor 40 in a position A1, at which it receives a first perforation P1 from the laser beam 34A. When the same cigarette has reached position A2 it receives its last perforation P2 from the beam 34A. Typically the cigarette will receive three other perforations from the beam 34A at positions intermediate positions A1 and A2. The required depth of field of the laser beam 34A is indicated at D.

The angle Θ which each of the beams 32A-D and 34A-D makes with the radial direction passing through the axis of a cigarette while it is being perforated is preferably in the range 30°–45°. This typically allows every pulse of each beam to be used for making perforations (i.e. 100% use of laser power): in other words, for any of the pulsed beams the pulse which makes the last perforation in a quadrant of a cigarette and the pulse which makes the first perforation in the corresponding quadrant of the next cigarette are consecutive pulses. Note that 100% laser utilization will generally occur only at settings requiring maximum dilution: at lesser settings some laser power will necessarily be directed to a dump (e.g. as explained below with reference to FIG. 6).

The disc 20 may have provision for controlling the duration of each pulse, so as to vary the sizes of the perforations and hence the dilution levels in the finished cigarettes, by intercepting and absorbing or diverting part of each pulse. This may be achieved by use of a reflective mask arranged coaxially with the disc 20 and movable so as to intercept a variable proportion of each pulse in the manner disclosed in said British patent specification No 2238704A. Briefly, the mask has a periphery formed with a saw-tooth profile each tooth of which can intercept a varying proportion of each element 22 and gap 24 of disc 20 according to the axial position of the mask relative to the disc 20, the axial position of the mask being controlled as explained below with reference to FIG. 6.

Figure 6:
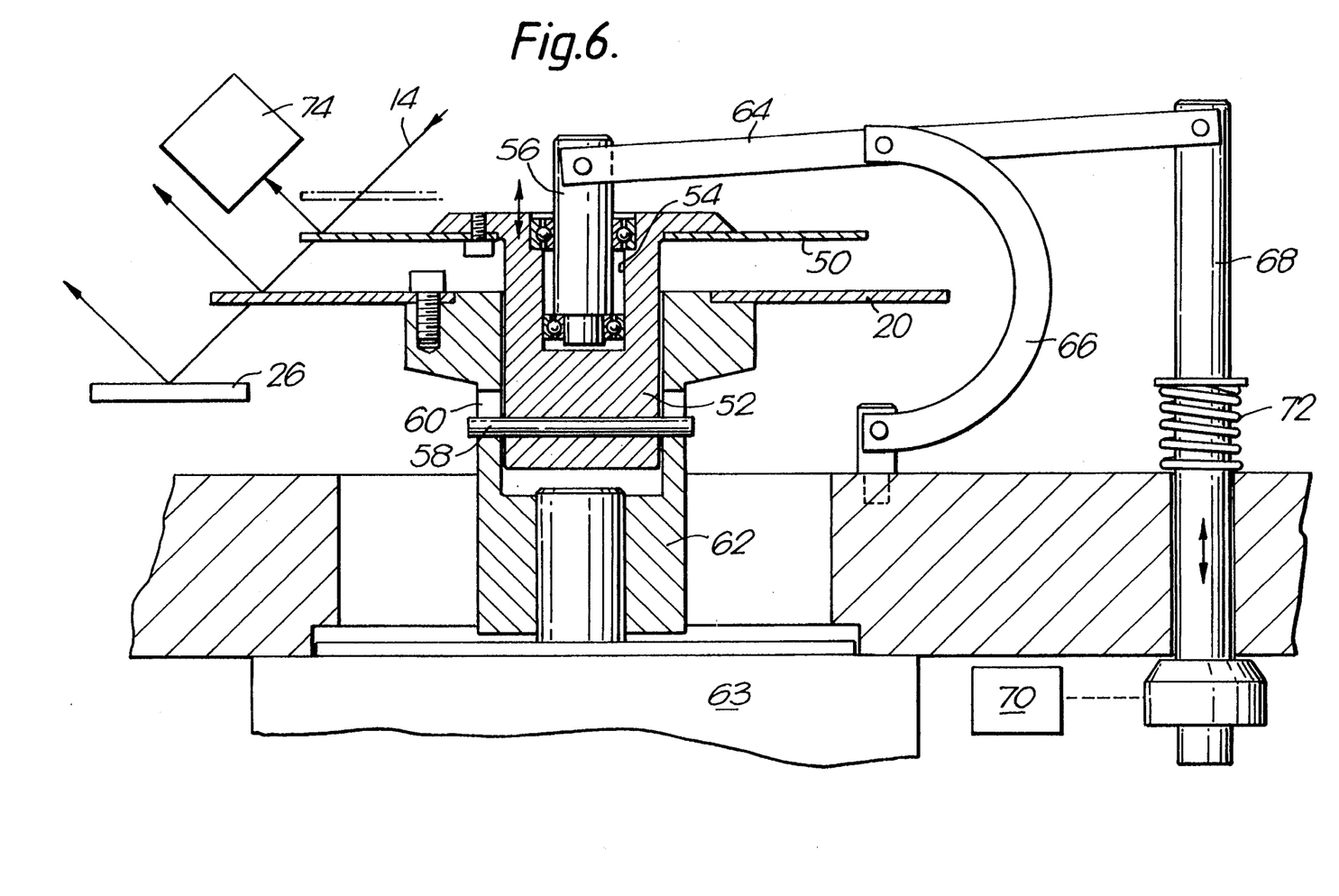
FIG. 6 is a part-sectional side view of a track switching disc in the apparatus of FIG. 1.

FIG. 6 shows the arrangement of the disc 20 in more detail. The disc 20 is provided with a coaxial mask 50, the position of which is axially movable. For this purpose, the mask 50 is connected to a cylindrical boss 52 having an axial upper bore 54 rotatably supporting a stub shaft 56. The lower end of the boss 52 carries a transverse pin 58 the ends of which are engaged in opposed slots 60 of a cylindrical member 62 rotatable with the disc 20. The shaft 56 is pivotally connected to one end of a lever 64 which is itself pivotally supported on a bracket 66. The other end of the lever 64 is connected to an actuating rod 68. An actuator 70 (e.g. a motor) is arranged to move the rod 68 against action of a return spring 72 surrounding the rod.

Downward movement of the rod 68 by the actuator 70 will cause corresponding upward movement of the mask 50. Hence, the actuator 70 is capable of positioning the mask 50, relative to the disc 20, so as to vary the level of interception of the mask with the incident beam 14. In the position shown in full line in FIG. 6 the mask 50 is in the position in which it intercepts the beam to a relatively little extent (i.e. corresponding to larger perforations and higher dilution); in the position shown partly by chain dot lines the mask 50 intercepts the beam to a greater extent (i.e. corresponding to smaller perforations and lower dilution). Note that engagement of the pin 58 in the slots 60 ensures that the mask 50 continues to rotate with the disc 20 in any position in which it is placed by the actuator 70. Drive for the disc 20 is derived from a servo motor 63, preferably phase locked to a master encoder rotatable with the unit 28.

A heat sink 74 is arranged to absorb that part of the beam 14 reflected by the mask 50.

Instead of using a movable mask to vary perforation size a mask arranged to intercept a fixed predetermined proportion of each pulse may be used in combination with means to provide fine control over perforation size, e.g. by adjustment of laser power. Thus if the size of perforation requires changing beyond that achievable with the fine control means the mask is replaced with a mask providing a different, and more appropriate, interception proportion.

Figure 7:
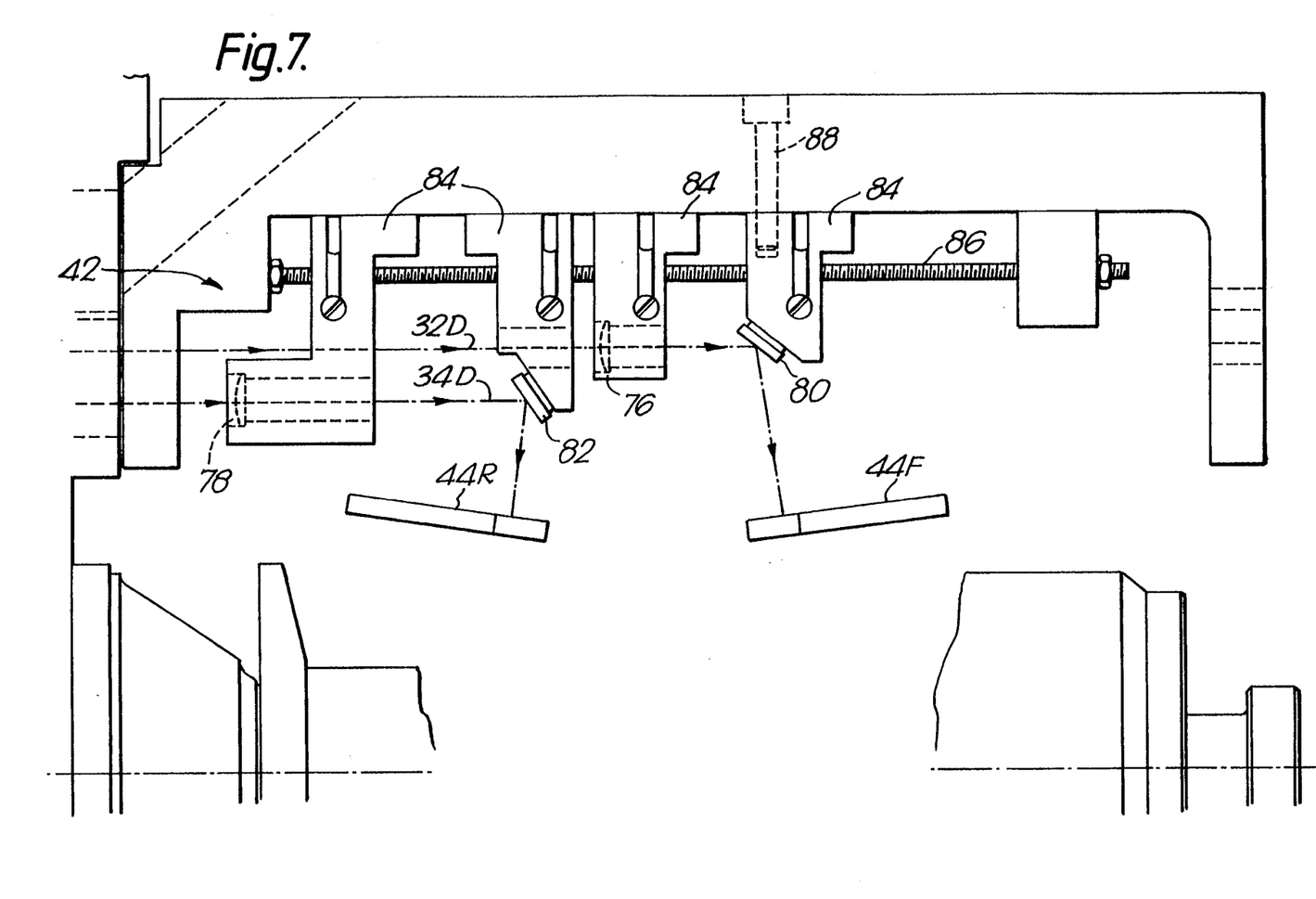
FIG. 7 is a side view of part of the apparatus of FIG. 1.

FIG. 7 shows a typical arrangement of the focusing and reflecting unit 42. Each beam 32D, 34D passes through respective final focusing lenses 76, 78 and is reflected by respective mirrors 80, 82. Each lens 76, 78 and mirror 80, 82 is mounted on a carrier 84, the position of which is adjustably movable on a slide 86. Locking screws 88 (only one of which is shown) are provided for each carrier 84. It will be understood that similar arrangements for the other beams 32A–C and 34A–C are provided; thus, there is a total of four rows of slides and carriers similar to the slide 86 and carriers 84. The arrangements are optically equivalent but in the arrangement of FIGS. 10 and 11 a second stationary mirror equivalent to the mirror 36 in FIGS. 1 and 2 is unnecessary because the unit 128 and mirror 130 are inclined so that the reflected beams extend in a direction which correspond to the direction of the beams reflected by the mirror 36.

The slide and carrier arrangement may be replaced by an arrangement in which each lens is mounted within a carrier having a cylindrical body having an axis parallel to that of the beam. The mirror may be similarly mounted on a cylindrical body, conveniently having the same axis and diameter as that of the corresponding lens. For each beam, the lens and mirror cylindrical bodies may be constrained, e.g. within a cylindrical guide having clamping means so that their relative axial and/or rotational positions may be adjusted.

Figure 8:
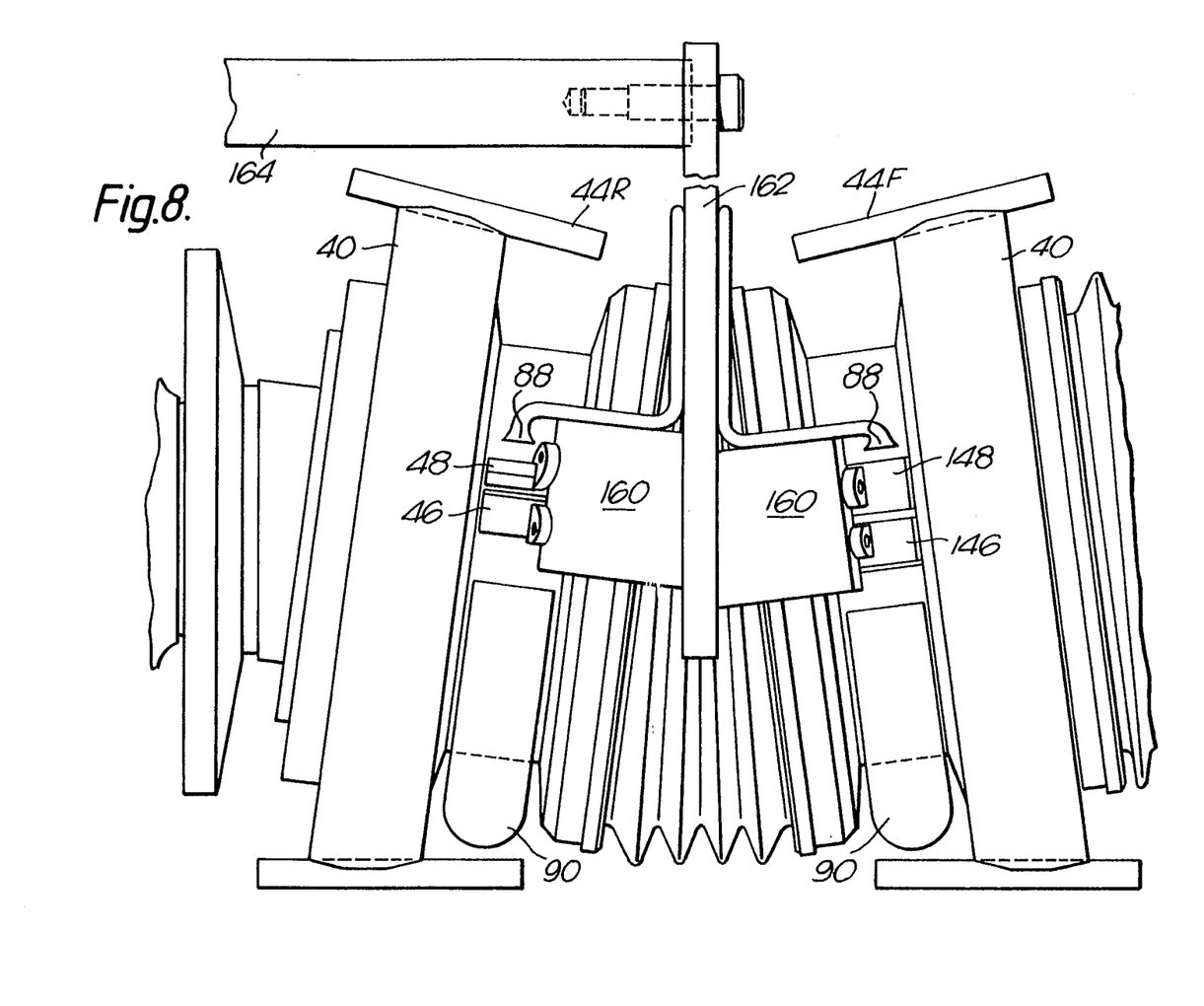
FIG. 8 is a plan view of another part of the apparatus of FIG. 1.

FIG. 8 shows in plan view the positions of the mirror 46, 48 shown in FIG. 4. It also shows corresponding mirrors 146, 148 for the beams 32B, 32C directed towards the cigarettes 44F. The mirrors 46, 48, 146, 148 are carried on cantilevered supports 160 which extend respectively from opposite sides of a central carrier 162 itself connected to a main support bracket 164. Since the mirrors 46, 48, 146, and 148 are in a region where they may be particularly prone to contamination with tobacco dust or other contaminants, a system is provided for keeping the surfaces of the mirrors relatively clean. This comprises an air blade 88 intended to provide a high velocity fish tail jet across each of the mirrors so as to remove contamination. The air flow is arranged to carry the entrained contaminants away through removal pipes 90 (which may be additionally provided with suction).

Figure 9:
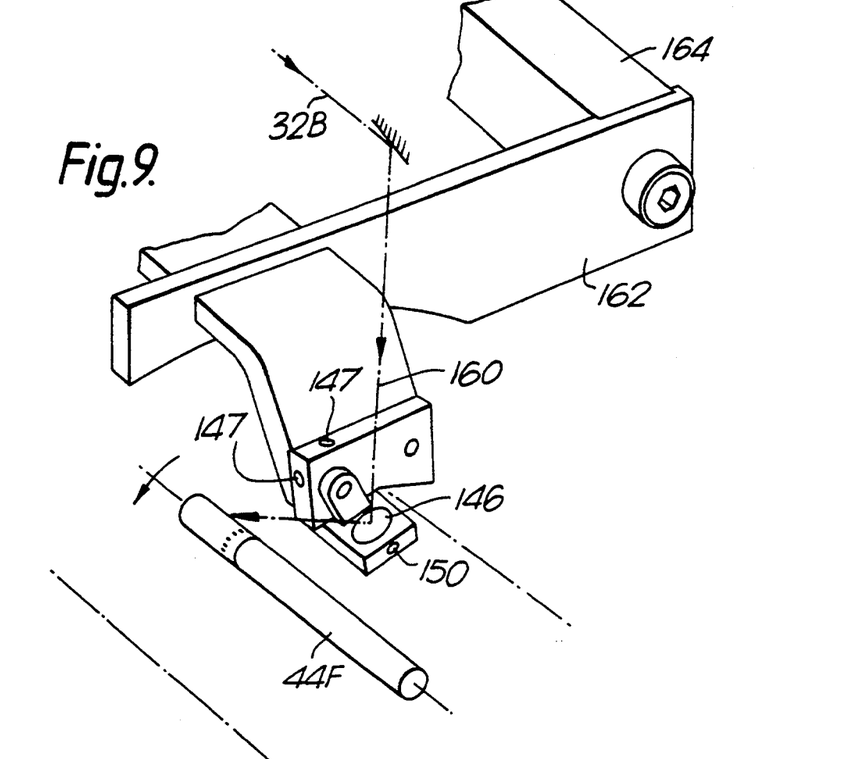
FIG. 9 is a perspective view of part of the apparatus shown in FIG. 8.

FIG. 9 shows in more detail the way in which the mirror 146 is mounted. The mirrors 46, 48 and 148 are mounted in a similar way. The mirror 146 is pivotally adjustable about a pivot axis which is generally parallel to the axis of the cigarettes 44F. Grub screws 147 are provided to effect angular adjustment of the mirror 146 about the axis.

In order to improve the quality of perforations made in the cigarettes the beam 14 may be directed through an aperture 168 in a stationary mask 170. The aperture 168, which may have a diameter of about 1 mm, restricts passage of higher order modes of the beam, which can cause marking (e.g. charring) around the edges of the perforations. It should be noted that the present system, in which beam pulses are produced by mechanical chopping techniques, is inherently capable of producing good quality perforations since it can provide shorter pulse rise and fall times as compared with electronic pulsing.

Figure 10:
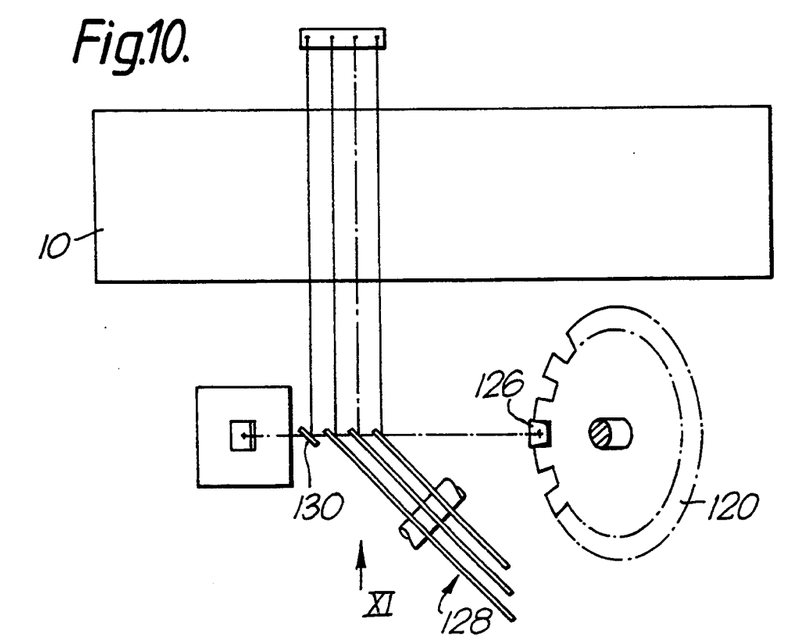
FIG. 10 is a plan view of a modified cigarette perforating apparatus.
Figure 11:
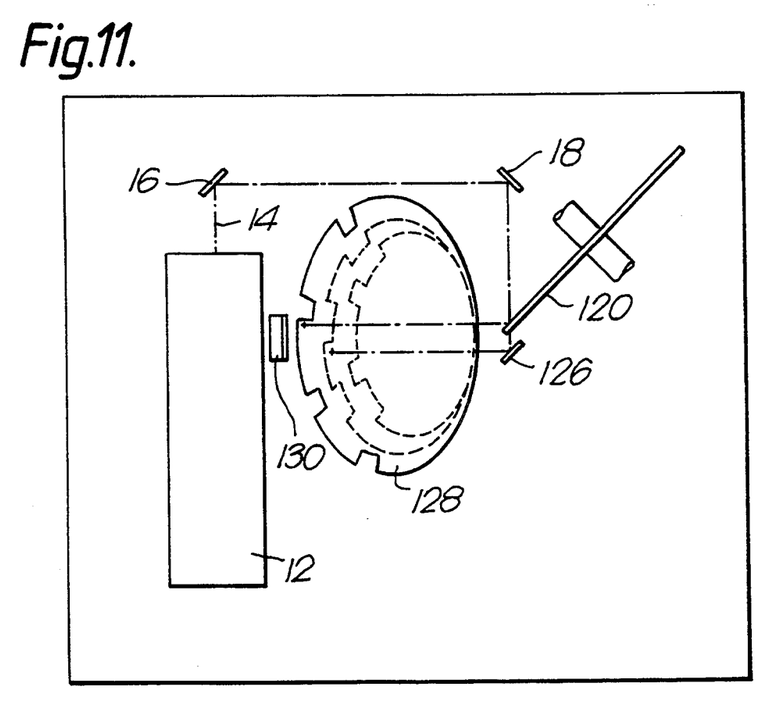
FIG. 11 is a side view in the direction of arrow XI in FIG. 10.

FIGS. 10 and 11 show an arrangement which is generally similar to that of FIGS. 1 and 2 and which operates in an analogous way. The disc 120, unit 128 and mirrors 126, 130 correspond in function to the disc 20, unit 28 and mirrors 26 and 30. From the point of view of convenience of obtaining drive from transmissions within the machine 10 the arrangement shown in FIGS. 1 and 2 is preferred to that of FIGS. 10 and 11. Typical rotational speeds of the disc 20 or 120 and the unit 28 or 128 are 5000 rpm and 1250 rpm respectively.

In each of FIGS. 2 and 11 the laser 12, which is typically a sealed $CO_2$ laser, may be arranged horizontally instead of vertically. A visible HeNe laser may be used for setting up alignment of mirrors, lenses and discs prior to operating with the main laser. More than one laser could be used to generate beams eventually following a common path. This may be useful where pulses in excess of those readily or economically obtainable with a single laser are desirable. Beams from different lasers may be polarized orthogonally, thereby allowing their beams to be conveniently combined at suitable optical components (e.g. a Brewster plate).

In order to sense when mirrors are becoming coated or otherwise contaminated with debris or dust, particularly the mirrors 46, 48, 146, and 148, they may incorporate a temperature sensor. A rise in temperature indicates that energy from the laser beams is being absorbed (instead of reflected) and indicates a need for cleaning. A simple thermocouple arrangement may be used to measure the temperature of the mirrors. The control circuit preferably incorporates correction for variations in ambient temperature. A temperature sensor 150 is shown adjacent the mirror 146 in FIG. 9.

Figure 12:
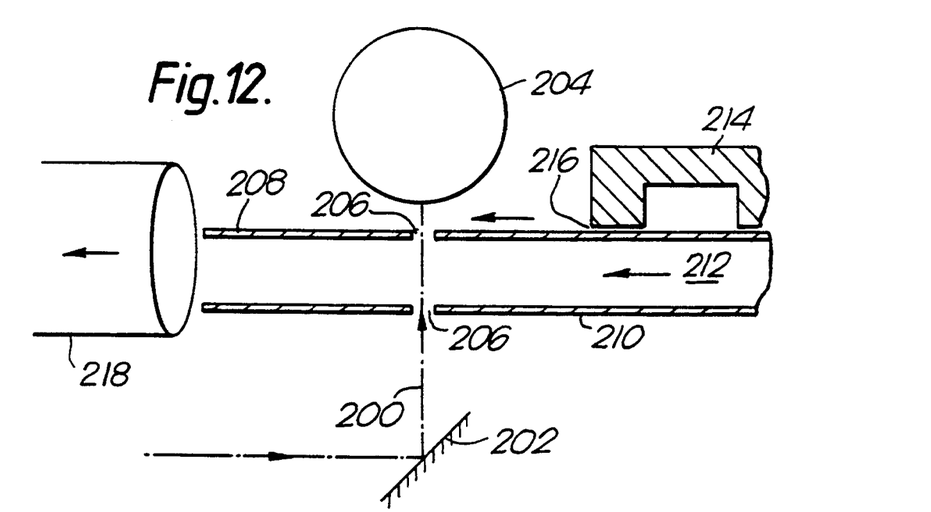
FIG. 12 is a sectional view of part of a further modified cigarette perforating apparatus.

FIG. 12 shows an arrangement for removal of contaminants, particularly those formed as a result of the production of the perforations by the beam, in which a laser beam 200 is reflected by a final mirror 202 towards a target cigarette 204. The beam 200 passes through apertures 206 formed in upper and lower plates 208, 210 defining an air channel 212. An air mover 214 having an air outlet 216 is carried on the upper surface of the upper plate 208. A mixture of air and water is supplied to the air mover 214. The quantity of water is small and is carried in the air. The air and water flow over the surface 208 by Coanda effect. The air, and particularly the water, entrain contaminants, particularly products of combustion, which would otherwise be deposited on the plate 208 and eventually obstruct the aperture 206. The plates 208, 210 provides a relatively narrow channel 212 through which a high velocity air stream is passed to deflect any other combustion products which pass through the aperture 206 in plate 208. By deflecting these products contamination of the adjacent mirror 202 is significantly reduced. A suction removal pipe 218 collects the air, water, and contaminants from the stream above and below the plate 208.

The air issuing from the air mover 214 acts as a carrier for the water, preferably in the form of a mist of fine droplets. Clearly, the quantity of water used should not be sufficient to drench the cigarette 204. The Coanda effect keeps the air stream close to the upper surface of the plate 208.

The arrangement of FIG. 12 may be used with any of the other disclosed arrangements. Although the plates 208, 210 are shown as flat, they may conveniently be curved so as to conform to the curvature of the path of the cigarette on a drum such as the drum 40. Again, the Coanda effect ensures that the air stream issuing from the air mover 214 will follow the plate 208 even when the latter is curved.

Figures 13, 14:
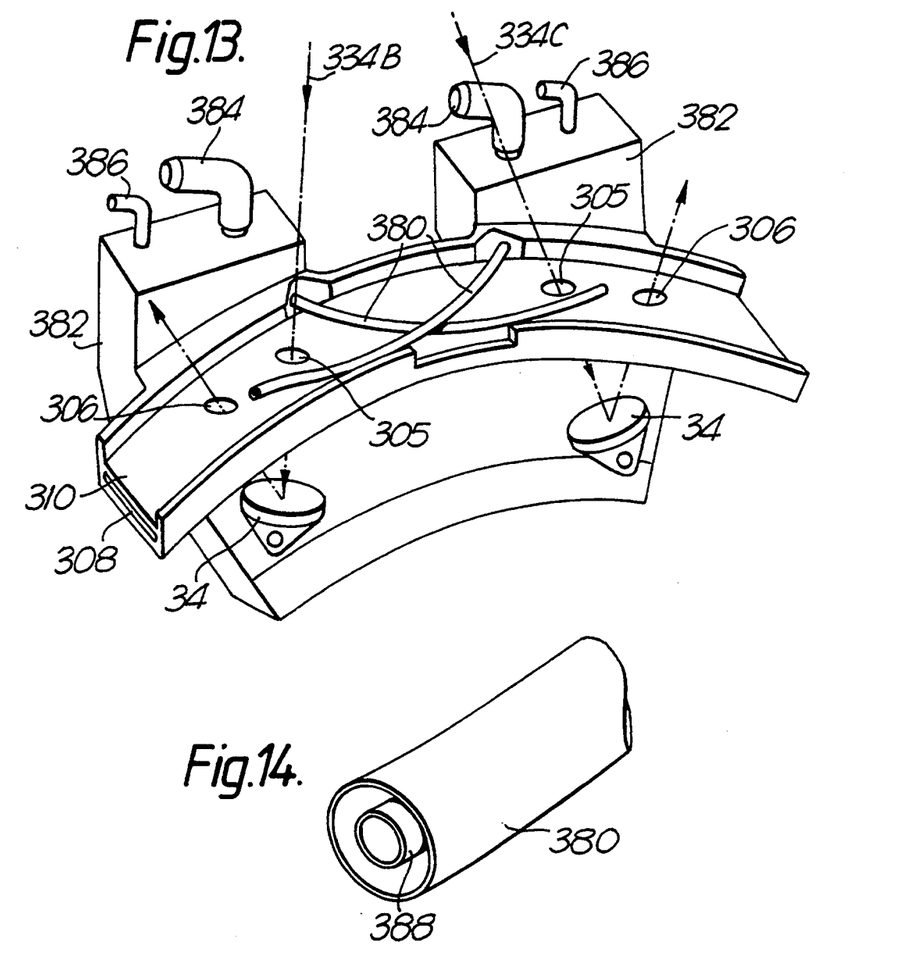
FIG. 13 is a perspective view of part of a further modified cigarette perforating apparatus.
FIG. 14 is a perspective detail of part of the apparatus of FIG. 13.

FIG. 13 shows an arrangement of a further modified perforating apparatus, including mirrors 346, 348 respectively similar in function to the mirrors 146, 148. Above the mirrors 346, 348 are upper and lower plates 308, 310 having apertures 305 and 306 for the passage of laser beams 334B and 334C. Adjacent the upper surface of the plate 310 are tubes 380 extending from units 382 provided with an air supply inlet 384 and a water supply inlet 386. Each tube 380 comprises an inner hypodermic tube 388 (FIG. 14). Typically the internal diameter of the tube 380 is 1.5 mm; that of the tube 388 is 0.58 mm (outside diameter: 0.89 mm). The outer tube 380 conveys air, typically at a rate of 4250 ml/minute; the inner tube 388 conveys water, typically at a rate of 1 ml/minute. The air directs a mixture comprising a mist of air and water at the region adjacent the aperture 306, this having a cleaning effect as described with reference to FIG. 12.

Figure 15:
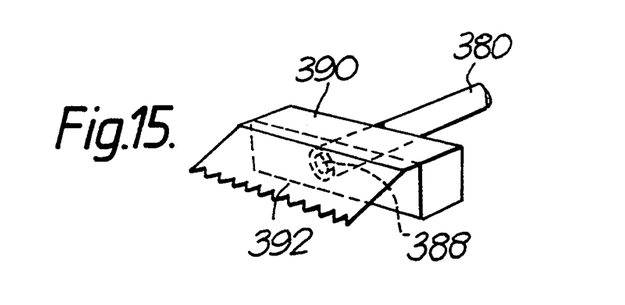
FIG. 15 is a perspective detail of a modification of the apparatus of FIG. 13.

The tubes 380 and 388 may terminate at a block 390 carrying a stainless deflector plate 392 having a serrated edge: the air/water mixture is directed against the deflector plate, which in turn spreads and directs the mixture as required, and assists in production of the required spray or mist of air and water.

Another possibility for maintaining optical components clean in the environment of a laser perforation system is to locate the components in a sealed unit which is kept at above-atmospheric pressure (with slight leakage only at the exit position of beam).

We claim:

1. Apparatus for perforating cigarettes, comprising a conveyor for supporting spaced cigarettes and conveying them along a path without rotating them about their own axes, means for generating an incident beam of laser radiation, means synchronized with said conveyor for producing a plurality of secondary beams from which incident beam, means for directing said secondary beams in sequence along a plurality of beam paths which intercept a cigarette at different positions along a portion of said path and which produce perforations in different portions of a cigarette, such that when a cigarette has traversed said portion of said path it has received perforations from each of said beams, at least two of said perforations being made at different times, said perforations lying in a row extending substantially around the circumference of the cigarette.

2. Apparatus as claimed in claim 1, wherein the means for producing secondary beams includes means for producing pulsed beams from said incident beam.

3. Apparatus as claimed in claim 2, wherein said directing means includes means for directing the secondary beams along paths which are stationary so that spacing of perforations on each of said portions of a cigarette is achieved by movement of the cigarette relative to said beam along said path.

4. Apparatus as claimed in claim 3, wherein said directing means is arranged so that the period during which each secondary beam produces perforations in each of said portions of a cigarette is related to the speed of conveyance of the cigarettes on said path such that the last perforation made in one cigarette and the first perforation made in the following cigarette are consecutive pulses of the respective secondary beam.

5. Apparatus as claimed in claim 3, wherein said directing means includes means for generating each secondary beam in the form of a series producing a predetermined number of perforations in a defined region of each cigarette.

6. Apparatus as claimed in claim 5, wherein said secondary beam generating means includes means for generating four secondary beams directed at four defined regions each lying in a quadrant of the cigarette defined by axes respectively parallel to and perpendicular to its direction of conveyance.

7. Apparatus as claimed in claim 1, wherein said directing means includes means for directing each secondary beam along a beam path which, immediately prior to incidence with the respective cigarette, lies at an angle which is in the region of 30°–45° to a line passing through the axis of the cigarette and perpendicular to its direction of conveyance.

8. Apparatus as claimed in claim 1, wherein said directing means includes means for generating at least two secondary beams along beam paths which intercept the cigarette from substantially opposite directions.

9. Apparatus for perforating cigarettes, comprising a conveyor for supporting spaced cigarettes and conveying them along a path without rotating them about their own axes; means for generating an incident beam of laser radiation; means synchronized with said conveyor for producing a plurality of secondary beams from said incident beam, including means for producing pulsed beams from said incident beams; means for directing said secondary beams in sequence along a plurality of beam paths which intercept a cigarette at different positions along a portion of said path and which produce perforations in different portions of a cigarette, such that when a cigarette has traversed said portion of said path it has received perforations from each of said beams, said perforations lying in a row extending substantially around the circumference of the cigarette, wherein said directing means includes means for directing the secondary beams along paths which are stationary, so that spacing of perforations on each of said portions of a cigarette is achieved by movement of the cigarette relative to said beam along said path, and means for generating each secondary beam in the form of a series producing a predetermined number of perforations in a defined region of each cigarette; and wherein said secondary beam generating means includes means for making at least two perforations in a defined region of a cigarette by consecutive pulses of the respective secondary beam.

10. Apparatus for perforating cigarettes, comprising a conveyor for supporting spaced cigarettes and conveying them along a path without rotating them about their own axes; means for generating an incident beam of laser radiation; means synchronized with said conveyor for producing a plurality of secondary beams from said incident beam, including means for producing pulsed beams from said incident beams; means for directing said secondary beams in sequence along a plurality of beam paths which intercept a cigarette at different positions along a portion of said path and which produce perforations in different portions of a cigarette, such that when a cigarette has traversed said portion of said path it has received perforations from each of said beams, said perforations lying in a row extending substantially around the circumference of the cigarette, wherein said directing means includes means for directing the secondary beams along paths which are stationary, so that spacing of perforations on each of said portions of a cigarette is achieved by movement of the cigarette relative to said beam along said path, and means for generating each secondary beam in the form of a series producing a predetermined number of perforations in a defined region of each cigarette; and wherein said secondary beam generating means includes means for making all perforations in a first of said defined regions of a cigarette, followed by all perforations in a second of said defined regions of said cigarette.

11. Apparatus for perforating cigarettes comprising a conveyor for supporting spaced cigarettes and for conveying them along a path, means for generating an incident beam of laser radiation, means synchronized with said conveyor for producing a plurality of secondary beams from said incident beam, and means for directing said secondary beams in sequence along a plurality of beam paths which intercept a cigarette on said path, wherein the means for producing a plurality of secondary beams comprises first and second rotatable elements respectively rotatable about mutually inclined axes, each of said elements comprising alternating reflective and transmissive elements.

12. Apparatus as claimed in claim 11, wherein said means for producing a plurality of secondary beams comprises means for producing pulsed beams from a continuous incident beam.

13. Apparatus as claimed in claim 12, wherein said producing means is arranged such that each pulse of each of said secondary beams intercepts a cigarette on said path to produce a perforation.

14. Apparatus for perforating cigarettes being carried on a fluted drum, comprising means for producing a beam of laser radiation, and means including focusing/reflecting elements for directing said beam towards a cigarette path on said fluted drum so as to make perforations in cigarettes on said path with attendant production and release of potentially contaminating products, including means adjacent said path for reducing the tendency for said products to be directed along the path of said beam, wherein said means adjacent said cigarette path comprises a transverse channel located between a final element of said directing means and said cigarette path and formed by first and second spaced elements positioned adjacent said fluted drum and having apertures therein aligned with the beam path and through which the beam passes and means for directing an air stream through the channel transverse to the beam and across said apertures for deflecting or diverting potentially contaminating products away from the beam path.

15. Apparatus for perforating cigarettes, comprising means for producing a beam of laser radiation, and means for directing said beam towards a cigarette path so as to make perforations in cigarettes on said path with attendant production and release of potentially contaminating products, including means adjacent said path for reducing the tendency for said products to be directed along the path of said beam, wherein said means adjacent said path includes means for directing a mixture of air and water to remove said potentially contaminating products.

16. Apparatus as claimed in claim 15, including means defining a surface having an aperture through which the beam is arranged to pass, and means for directing a mixture of air and water along said surface, preferably in Coanda effect, so as to deflect potentially contaminating products away from said aperture.

17. Apparatus as claimed in claim 16, wherein said surface defining means includes channel means, said mixture directing means including means for directing said mixture through said channel means.

18. Apparatus as claimed in claim 15, wherein said mixture directing means includes means defining first and second paths for air and water respectively, said paths terminating at adjacent positions adjacent said cigarette path.

19. Apparatus as claimed in claim 18, wherein said mixture directing means includes means for directing air and water against a deflector which assists in directing said mixture.

20. Apparatus as claimed in claim 18, including first and second tubes defining said first and second paths respectively, said second tube being contained within said first tube.

21. Apparatus as claimed in claim 15, wherein said directing means includes means for directing air and water at respective rates of 4000:1 or greater by volume.

22. Apparatus as claimed in claim 15, wherein said directing means includes spray means for directing a spray or mist of said mixture.

23. Apparatus as claimed in claim 17, wherein said temperature detecting means is mounted on or adjacent said element.

24. Apparatus for perforating cigarettes, as claimed in claim 1, wherein said directing means includes at least one reflective or transmissive element potentially subject to contamination tending to reduce the transmission or reflection properties of said element, and wherein means are provided for detecting a change in temperature due to absorption of radiation by said contaminants, whereby an indication of excessive contamination may be provided.

* * * * *